US012673435B2

(12) United States Patent
Cecili et al.

(10) Patent No.: US 12,673,435 B2
(45) Date of Patent: Jul. 7, 2026

(54) GRIPPING TOOL WHICH CAN BE USED BY A MANIPULATOR DEVICE FOR PICKING UP AND HANDLING PIECES

(71) Applicant: Comau S.p.A., Grugliasco (IT)

(72) Inventors: Marco Cecili, Grugliasco (IT);
Fabrizio Girardin, Grugliasco (IT);
Constantino Pischedda, Grugliasco
(IT); Luca Piras, Grugliasco (IT)

(73) Assignee: Comau S.p.A., Grugliasco (IT)

( * ) Notice: Subject to any disclaimer, the term of this
patent is extended or adjusted under 35
U.S.C. 154(b) by 1060 days.

(21) Appl. No.: 17/784,323

(22) PCT Filed: Dec. 11, 2020

(86) PCT No.: PCT/IB2020/061803
§ 371 (c)(1),
(2) Date: Jun. 10, 2022

(87) PCT Pub. No.: WO2021/116990
PCT Pub. Date: Jun. 17, 2021

(65) Prior Publication Data
US 2023/0046562 A1      Feb. 16, 2023

(30) Foreign Application Priority Data

Dec. 13, 2019     (IT) ........................ 102019000023898

(51) Int. Cl.
*B25J 15/06*        (2006.01)
*B25J 15/00*        (2006.01)
(52) U.S. Cl.
CPC ....... *B25J 15/0608* (2013.01); *B25J 15/0052*
(2013.01)

(58) Field of Classification Search
CPC ................ B25J 15/0608; B25J 15/0052; B25J
15/0061; B33Y 80/00
See application file for complete search history.

(56) References Cited

U.S. PATENT DOCUMENTS 9,352,941 B2 *  5/2016  Wheeler ............... B66C 19/005
9,882,067 B2 *  1/2018  Britcher .................. H02S 20/00
(Continued)

FOREIGN PATENT DOCUMENTS

DE      102006047285 B3      1/2008
DE      102010025392 A1      12/2011
(Continued)

OTHER PUBLICATIONS

Juergen Kortberg: "3D Printed End-of-Arm Tooling & Fixtures",
ASS End-of-Arm Tooling Inc.Automate 2017,2017, XP055718884,
Retrieved from the Internet: URL:https://www.automateshow.com/
filesDown Toad.cfm?d1=Kortberg-3DPrintedEndofArmTool
ingandRoboticGrippers.pdf [retrieved on Jun. 10, 2022] pp. 5,6,7,10.
(Continued)

*Primary Examiner* — Stephen A Vu

(57) ABSTRACT

A gripping tool, which can be used by a manipulator device
for picking-up and handling pieces, includes a plurality of
gripping devices (50), distributed in groups, each group
consisting of one or more gripping devices. The gripping
devices (50) of each group of gripping devices are mounted
on a same supporting body (P), which is made in one-piece
by an additive manufacturing technology.

9 Claims, 5 Drawing Sheets

(56)            References Cited

U.S. PATENT DOCUMENTS

| | | | |
|---|---|---|---|
| 11,245,353 | B2 | 2/2022 | Di Stefano et al. |
| 2010/0180711 | A1 | 7/2010 | Kilibarda et al. |
| 2015/0107075 | A1* | 4/2015 | Clarke ................... E02F 9/2833 |
| | | | 29/703 |
| 2016/0052148 | A1* | 2/2016 | Shi ......................... B25J 15/009 |
| | | | 29/559 |
| 2017/0222506 | A1* | 8/2017 | Silke .................... B25J 15/0608 |

FOREIGN PATENT DOCUMENTS

| | | | |
|---|---|---|---|
| DE | 102016009470 | B3 | 8/2017 |
| EP | 1541255 | A1 | 6/2005 |
| WO | 2015 181772 | A1 | 12/2015 |

OTHER PUBLICATIONS

Emicorp: "EMI Robot End of Arm Tooling—1-3,6n Catalog R20".

* cited by examiner

GRIPPING TOOL WHICH CAN BE USED BY A MANIPULATOR DEVICE FOR PICKING UP AND HANDLING PIECES

CROSS-REFERENCE TO RELATED APPLICATIONS

This application is filed pursuant to 35 U.S.C. § 371 claiming priority benefit to PCT/IB2020/061803 filed Dec. 11, 2020, which claims priority to Italian Patent Application No. 102019000023898 filed Dec. 13, 2019, the contents of both applications incorporated herein by reference in their entirety.

TECHNICAL FIELD

The present invention relates to a gripping tool which can be used by a manipulator device for picking up and handling pieces.

The tool according to the invention is of general application. A particularly preferred exemplary application is related to the case of picking-up and positioning a metal piece in a welding station, for assembling a motor-vehicle structure or a sub-assembly thereof. Also of any type is the manipulator device on which the tool according to the invention can be used. A typical example of use is that of a multi-axis manipulator robot.

The invention relates, in particular, to a gripping tool of the known type comprising:

a supporting frame, equipped with an attachment element for connection to the manipulator device, a plurality of gripping devices, carried by the supporting frame in such a way as to be adjustable in position with respect to the supporting frame, and at least one sensor associated with the gripping devices for detecting the presence of a piece engaged by the gripping devices.

BACKGROUND

Gripping tools of the type indicated above are normally used, for example, in assembling stations for assembling motor-vehicle structures, for the purpose of positioning a piece in the assembling position on another sheet metal element, and to keep it in the correct assembling position during the welding operation. The supporting frame of the gripping tool is rigidly connected to an attachment flange for connection to the wrist of a manipulator robot. The robot is thus able, by means of the aforesaid gripping tool, to pick up and hold a piece in a correct assembling position on another element which—in turn—is prepared and located in position on a stationary fixture in the assembling station.

Gripping tools of the aforesaid type are illustrated, for example, in documents DE 10 2006 047285 B3 and DE 10 2016 009470 B3.

Tools of the type indicated above, which have been produced up to now, have a relatively complex and heavy structure and require long and laborious calibration operations.

A tool according to the preamble of claim 1 is known from document XP055718884 "3D Printed End-of-Arm Tooling & Fixtures" (Juergen Kortberg) published in 2017 for the show "Automate 2017", and from document XP055774453 EMIcorp "EMI Robot End of Arm Tooling—Catalog R20—July 2019.

SUMMARY

One object of the invention is to provide a gripping tool having the characteristics of a considerably simplified, light and compact structure, which also is of a relatively reduced cost.

Another important object of the invention is to provide a gripping tool having characteristics in which the calibration operations of the tool for use in an assembling station are considerably simpler and faster compared with what is possible with devices of the prior art.

In order to achieve one or more of the aforesaid objects, the invention relates to a gripping tool having the above characteristics, and further wherein:

the gripping devices are distributed in groups, each group consisting of one or more gripping devices, the gripping devices of each group of gripping devices are mounted on the same supporting body made in one-piece using additive manufacturing technology, the aforesaid supporting body of each group of gripping devices (50) is mounted on said supporting frame in such a way as to be adjustable in position with respect to the supporting frame along three mutually orthogonal axes, the aforesaid supporting body of each group of gripping devices made in one-piece by additive manufacturing technology is shaped in such a way as to define locating surfaces for contact with a piece to be gripped, the configuration of said locating surfaces being adapted to the configuration of the piece to be gripped, in such a way as to constitute a reference for the correct positioning of the piece to be gripped along said three mutually orthogonal axes with respect to said supporting body, the gripping tool being characterized in that the supporting body of each group of gripping devices incorporates—in one-piece—one or more connecting portions, each connecting portion having a cavity within which a supporting rod is secured, each supporting rod is carried by the supporting frame so as to be adjustable in position relative to the supporting frame.

Preferably, the supporting body of at least one of the aforesaid gripping devices also supports said sensor.

"Additive manufacturing" technology has been known and used for some time. It uses an energy source, such as a laser beam, to melt layers of powders of synthetic material or metal material in such a way as to form—layer by layer—a component with a required configuration. A machine for producing metal components using additive manufacturing technology is, for example, described and illustrated in document WO 2015 181772 A1.

Thanks to the use of the aforesaid technology, the gripping tool according to the invention can be obtained with a significantly less complex and lighter structure than known tools. In fact, the supporting body made by means of additive manufacturing technology, which supports each group of gripping devices, is made with any configuration suitable for simultaneously satisfying several functions: this supporting body is—first of all—arranged to support the gripping devices. Secondly, this supporting body defines the locating surfaces intended to come into contact with the picked-up piece to refer the piece into a precise position with respect to the tool, and consequently to allow the robot to position the picked-up piece in a precise position in the assembling station. Finally, the same supporting body also performs the function of supporting the aforesaid sensor arranged to detect the presence of the picked-up piece. The material constituting each supporting body obtained with additive manufacturing technology can also be synthetic material or composite material including reinforcing fibres.

Thanks to the aforesaid characteristics, the complexity and weight of the tool are significantly reduced compared to known devices, with the advantage of being able to use smaller-sized manipulator robots (i.e., with lower payload), and/or to use, once the robot size is established, tools with a greater number of gripping devices. A further advantage of the configuration described above lies in that the adjustment operations of the tool necessary in the initial calibration step of the assembling station are considerably simplified. Once a piece has been picked up, the robot positions the tool in a predetermined programmed position, corresponding to the nominal positioning of the picked-up piece in the assembling station. In this condition, the operator can adjust the position of the supporting body of each group of gripping devices in such a way as to obtain precise positioning of the piece in the assembling station, for example, with respect to another piece which has been already prepared and located in position in said assembling station.

In a preferred example, the gripping devices are magnetic-effect gripping devices, each comprising a supporting casing and a magnet that can be pneumatically displaced within the supporting casing between an operative position, adjacent to a front end of the supporting casing, which is arranged to engage a piece to be picked up, and an inoperative position, rearwardly displaced with respect to said front end of the supporting casing; said tool being characterized in that the supporting casing of each magnetic-effect gripping device is rigidly connected to a respective supporting body obtained by additive manufacturing technology.

The magnetic-effect gripping devices can be of any known type. Gripping devices of this type are, for example, produced and marketed by company Goudsmit Magnetic Systems BV (see also EP 1 541 255 A1).

The operating principle of these magnetic-effect gripping devices is illustrated in FIGS. 1, 2 of the attached drawings. These figures diagrammatically show a magnetic-effect gripping device, indicated—in its entirety—with the reference number 1, including a supporting casing 2 in the form of a hollow cylinder within which a permanent magnet 3 is slidably mounted. The magnet 3 can be moved within the supporting casing 2 between an operative position adjacent to a front end 4 of the supporting casing 2, which is arranged to engage a piece to be picked up (FIG. 1), and an inoperative position set back with respect to the front end 4 in which the magnet 3 is carried when it is necessary to release a previously picked-up piece. The displacement of the magnet 3 between its operative position and its inoperative position is obtained by feeding a flow of pressurized air into one of the two openings 5, 6 of the supporting casing 2 (arrow A) and sucking air from the other of these openings (arrow B).

The use of magnetic-effect gripping devices in the gripping tool according to the invention is only a preferred example, being understood that it is entirely possible to use gripping devices of any other known type, for example, suction cup gripping devices.

In the invention, the supporting body of each group of gripping devices incorporates—in one-piece—connecting portions having cavities within which supporting rods are secured, which are carried by the supporting frame so as to be adjustable in position. In one embodiment, the supporting rods can be locked in position along their axis within clamps, which are—in turn—adjustable in position on a respective auxiliary supporting tube along a first axis orthogonal to the axis of the supporting rods. The auxiliary supporting tube is—in turn—adjustable in position, along a second axis, orthogonal to the first axis, and to the axis of the supporting rods, on a main supporting tube carried by the aforesaid supporting frame of the tool.

BRIEF DESCRIPTION OF THE DRAWINGS

Further characteristics and advantages of the invention will emerge from the following description with reference to the attached drawings, provided purely by way of non-limiting example, wherein.

DETAILED DESCRIPTION

Figure 1:
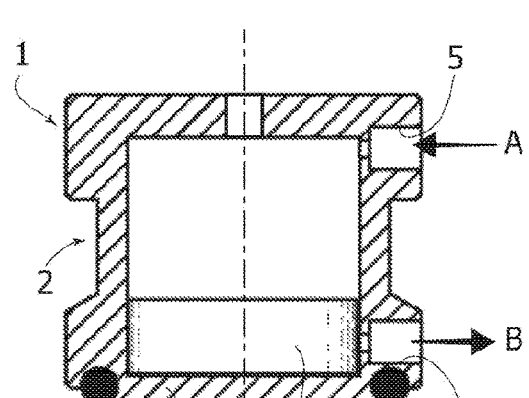
FIGS. 1, 2 are schematic views showing the operating principle of a magnetic-effect gripping device.

With reference to FIGS. 3-7, reference number 8 indicates a gripping tool (or "gripper") that can be used on a manipulator robot of any known type to pick up and position pieces in an assembling station, for example, in a processing station for welding motor-vehicle structures or sub-assemblies thereof.

It is, of course, evident that the gripping tool 8 according to the invention is of general use and that, in particular, it could be used with any type of handling device or machine. Furthermore, the tool 8 according to the invention can be used not only to pick up and position pieces in a station in which the picked-up piece must be assembled on a piece previously arranged in a precise position in the station, but also to pick up and position pieces in any other type of industrial equipment, or even just to transfer pieces from one station to another in a production plant.

The tool 8 comprises a metal supporting frame 9 which—in the illustrated example—includes a column 10 from which an arm 11 protrudes laterally and ends with an attachment flange 12, for attaching to a wrist of a multi-axis manipulator robot of any known type.

Again, with reference to the specific illustrated example, the column 10 has two opposite ends bearing attachment flanges 9A, 9B. The attachment flange 9A is used to screw a plate 13 thereon, which supports the tool. At the other end of the column 10, the flange 9B is intended for connecting to an additional tool of any type, for example, another gripping tool 8 or, for example, an electric spot-welding head, or any other type of operator tool.

Therefore, in the illustrated example, a manipulator robot whose wrist is connected to the attachment flange 12 is able to use the tool 8 in certain operating steps to pick up and position pieces in an assembling station, and in other operating steps is able to use the additional tool (for example, a welding head) connected to the attachment flange 9B, to carry out further operations (for example, spot welding) on a piece which has been previously picked-up and positioned in the assembling station.

Naturally, this configuration is illustrated herein purely by way of example; it is to be understood that a manipulator robot or any other manipulator machine could be provided only with the gripping tool 8 which is described herein.

Figure 3:
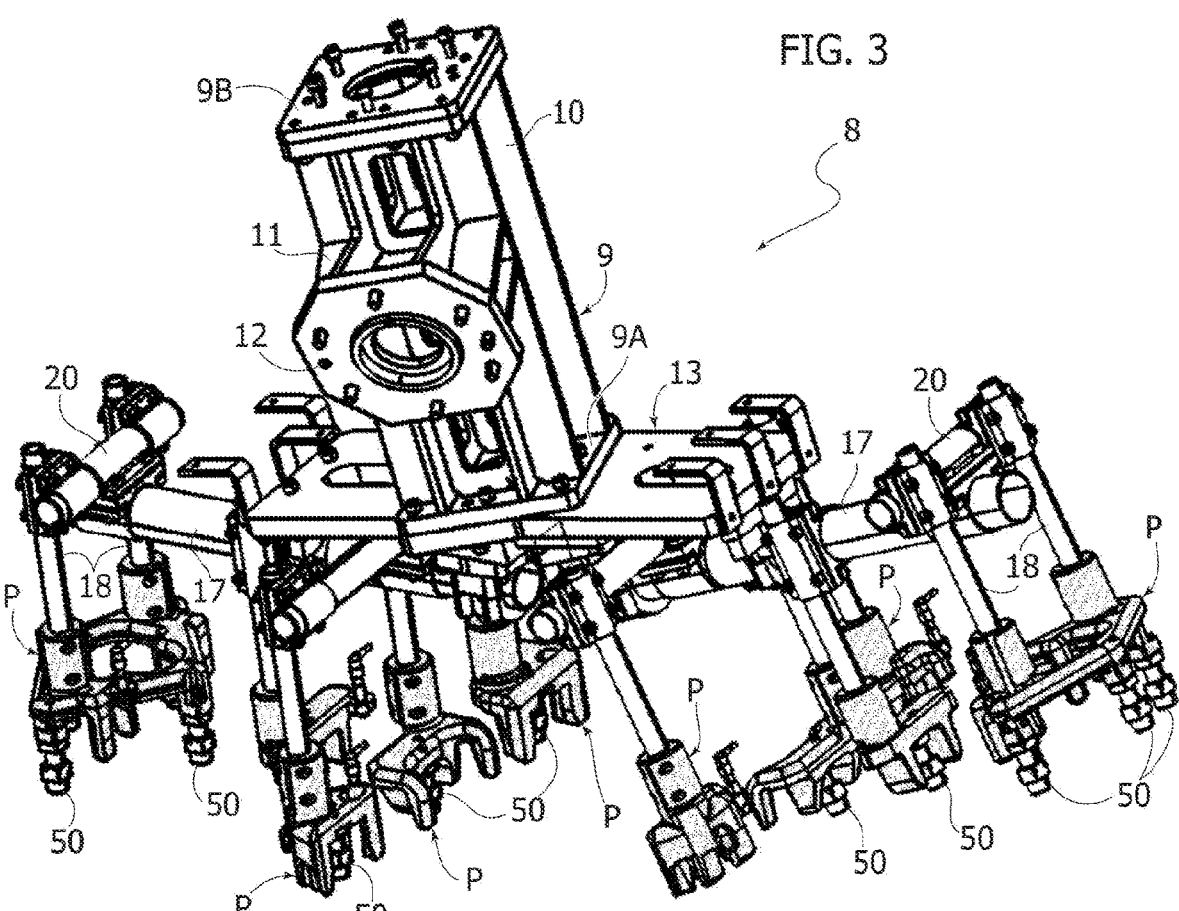
FIG. 3 is a perspective view of a preferred embodiment of a gripping tool according to the invention (in this Figure, the casings of the solenoid valves controlling the flow of pressurized air which is necessary to activate the magnetic-effect gripping devices have been removed)
Figure 4:
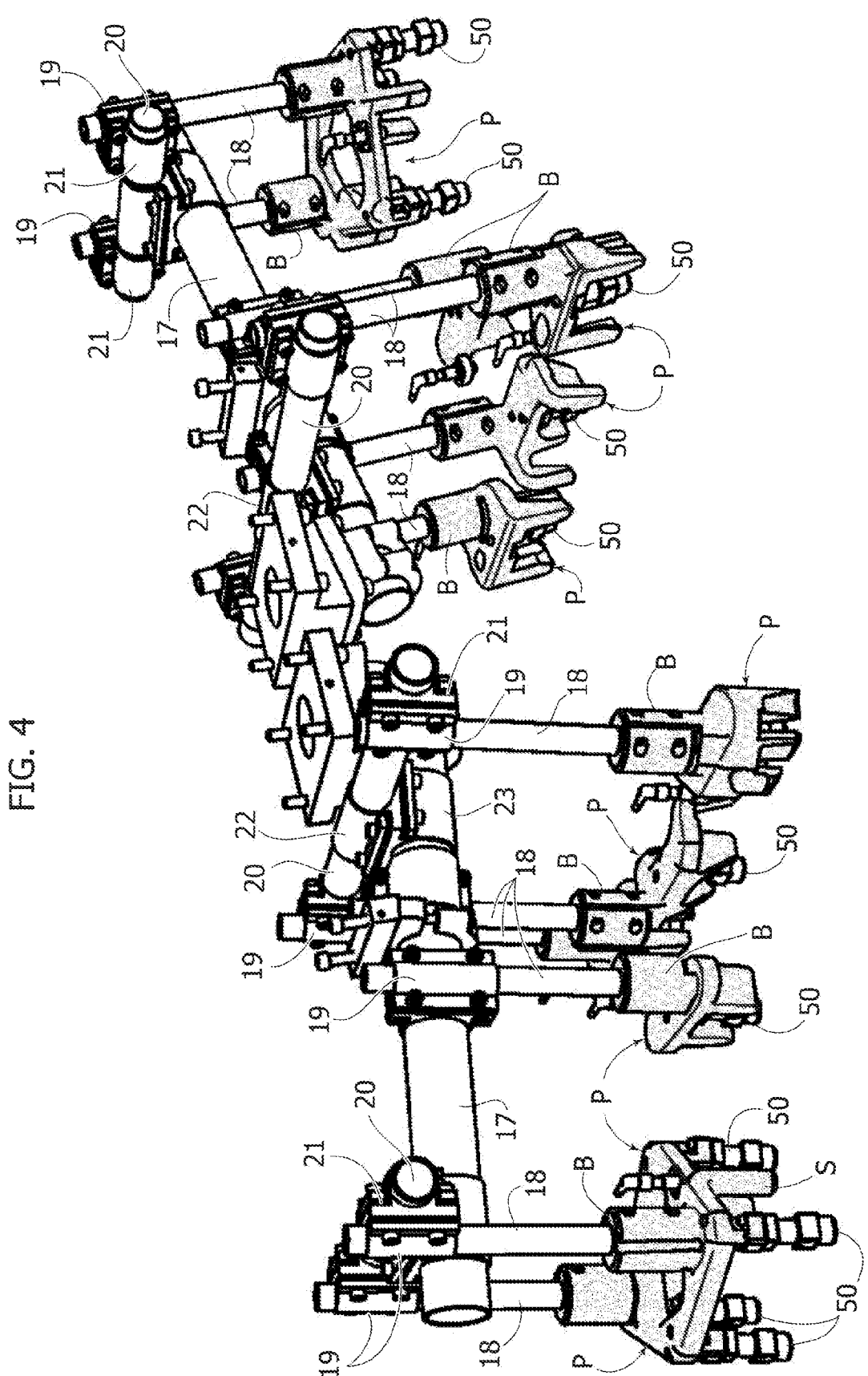
FIG. 4 is an additional perspective view of the tool of FIG. 3, in which the supporting frame of the tool has been removed.
Figure 5:
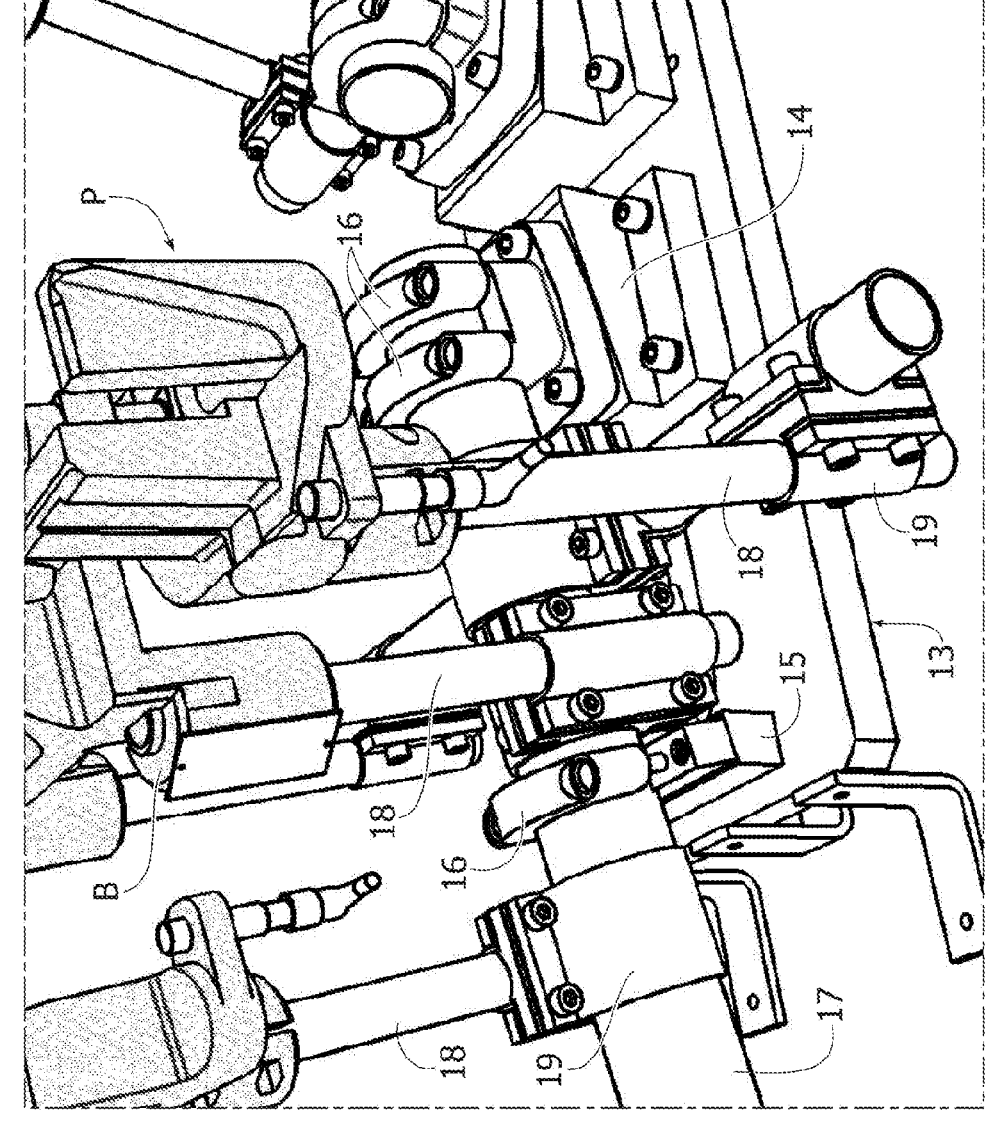
FIGS. 5, 6 are further perspective views on an enlarged scale illustrating some details of the tool of FIGS. 3, 4.
Figure 6:
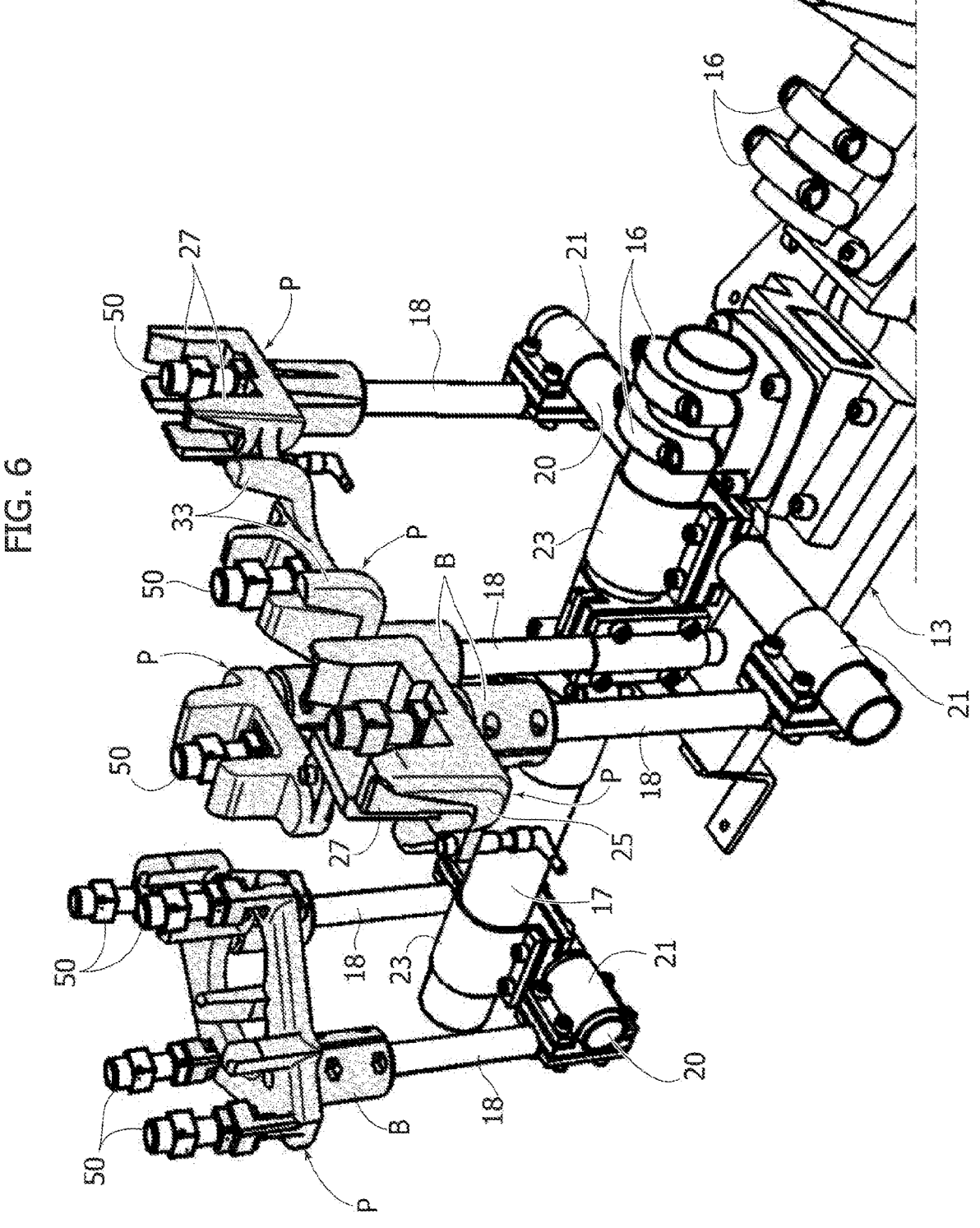

With reference in particular to FIG. 5, supporting blocks 14, 15 are screwed to the supporting plate 13 (FIGS. 5, 6 show the tool in an inverted position with respect to the position of FIGS. 3, 4, to show the face of supporting plate 13 which is hidden in FIG. 3). U-shaped supporting brackets 16 are—in turn—screwed to the supporting blocks 14, 15, serving to clamp supporting tubes 17 (which protrude from the two ends of the plate 13) between the blocks 14, 15 and the brackets 16.

Figure 2:
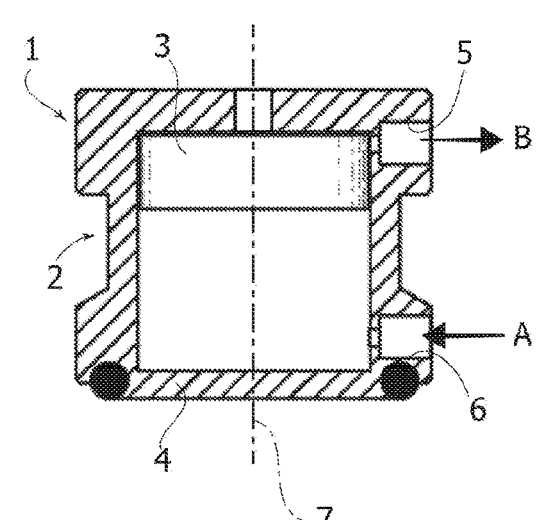

In the case of the illustrated example, the gripping devices with which the tool 8 is provided are magnetic-effect gripping devices, of the type diagrammatically shown in FIGS. 1, 2, and are designated in the drawings with reference number 50. As an alternative to these devices, however, it would be possible to use any other type of gripping devices, such as suction cup gripping devices.

Whatever the type of gripping devices used, the gripping devices 50 are distributed in groups, each group being made up of one or more gripping devices 50. The gripping devices 50 of each group are all carried by the same supporting body P, which is connected to the frame 9 in the manner described in detail hereinafter.

According to the invention, each supporting body P is made in a single piece, of metal material or synthetic material, by means of an additive manufacturing technology. Each gripping device 50 is fixed to the respective supporting body P by any connecting means (for example, by screws).

Each supporting body P incorporates one or more connecting portions B, which have cavities within which supporting rods 18 are received and locked (by means of screws).

With reference to the drawings and, in particular, to FIG. 4, each supporting rod 18 is locked in position within a clamp 19, including two clamping brackets clamped together and around the respective rod 18 by means of screws. The clamp 19 can be released by loosening its tightening screws, to allow adjustment of the respective supporting rod 18 along the axis of the supporting rod, after which it can be tightened again to lock the rod 18 and, consequently, the respective supporting body P in the required position.

At least some of the clamps 19 are—in turn—adjustable in position along a first axis of an auxiliary supporting tube 20, orthogonal to the rods 18, which is—in turn—rigidly connected to a respective main supporting tube 17. To this end, a plate forming part of the clamp 19 is—in turn—clamped on the auxiliary tube 20 with the aid of an additional clamping flange 21 (see, in particular, the left-hand part of FIG. 4).

Again, with reference to FIG. 4, the auxiliary supporting tubes 20 are rigidly connected by means of U-shaped brackets 22 (see also FIG. 6), which cooperate with additional U-shaped brackets 23 to clamp the respective tube 17 between them.

In this way, the position of the body P that supports each group of gripping devices 50 can be adjusted in the direction of the axis of the rods 18, as well as in the direction of the first axis of the auxiliary supporting tubes 20, and in the direction of the second axis of the main supporting tube 17, i.e., along three mutually orthogonal axes.

As better visible in the left part of FIG. 4, one or more of the supporting bodies P also carries a sensor S of any known type, intended to come into contact with a picked-up piece, and to emit an electrical signal indicating the presence of the piece.

Figure 7:
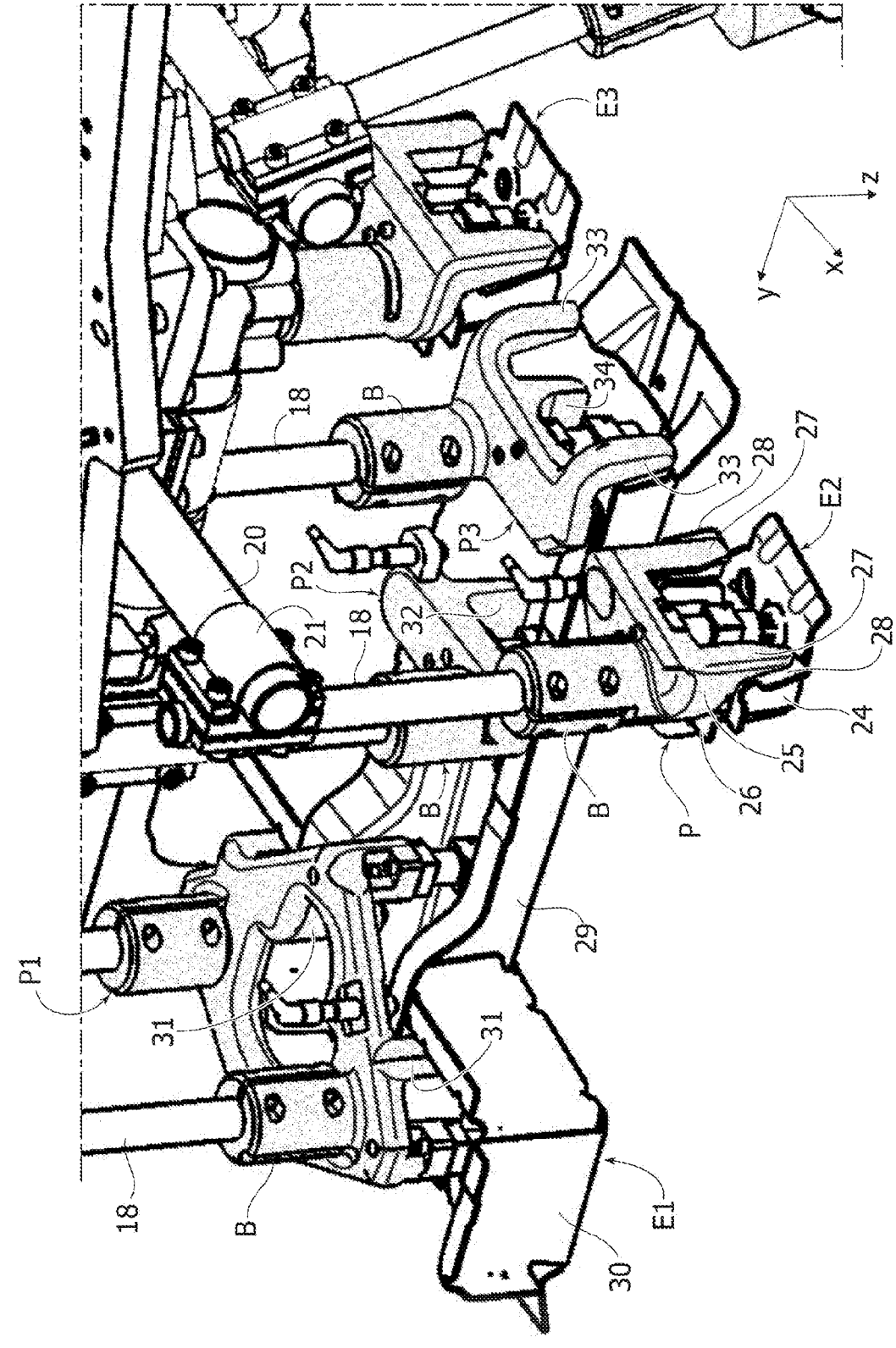
FIG. 7 is a perspective view illustrating a detail on an enlarged scale of a piece picked up by the gripping tool according to the invention.

FIG. 7 shows—purely by way of example—a detail of the tool 8 of FIGS. 3, 4 in the condition in which it has simultaneously picked up a plurality of pieces E1, E2, E3 intended to be positioned and welded on a motor-vehicle floor panel structure in a station for assembling the vehicle floor panel. In this specific application, the floor panel portion on which the elements E1, E2, E3 must be welded is preliminarily arranged in a precise position, with respect to a set of three mutually orthogonal reference axes x, y, z, on a stationary fixture of an assembling station, and locked therein. The manipulator robot on which the gripping tool 8 is set up is programmed to arrange the elements E1, E2, E3 on the floor panel portion arranged on the stationary fixture. The tool 8 is configured in such a way that the gripping devices 50 are each oriented orthogonally to the surface of the piece engaged thereby.

In the aforesaid condition, the elements E1, E2, E3 picked up by the gripping tool 8 are located in position with respect to the tool itself, since the supporting body P that supports each group of gripping devices 50 has locating surfaces that come into contact with corresponding surfaces of the elements to be picked up.

The configuration of these locating surfaces of the supporting body P is adapted to the configuration of the piece to be picked up. In the example of FIG. 7, the element E2 has, for example, wings 24 that come into contact with side locating surfaces 25 of the respective supporting body P, to refer the piece in position along a first direction. Similarly, the body P has another side surface, arranged in a plane orthogonal to that of surface 25, which comes into contact with another wing 26 of the element E2 to refer it in position along a second direction orthogonal to the first. The supporting body P also includes two fingers 27 projecting downwards, which come into contact with additional flanges 28 of the element E2, to constitute a further reference.

In the case of element E1, this element consists of a longitudinal element 29 and a cross-member 30. Element E1 is gripped by three groups of gripping devices 50 carried by the supporting bodies P, which—in FIG. 7—are indicated by P1, P2 and P3. The supporting body P1 has its gripping devices 50 that engage one end of the element 29 and the cross-member 30. The supporting body P1 includes downwardly projecting fingers 31, defining locating surfaces arranged in mutually orthogonal planes that enter into contact with respective portions of the cross-member 30, to bring them into position along the longitudinal axis x of the floor, and along the transverse axis y. Additional fingers 32 projecting downwards from the supporting body P2 come into contact with the inner and outer surfaces of the element 29 to locate it in position along the y axis and along the x axis.

The supporting body P3, located at the opposite end of the element 29, also has fingers 33, 34 protruding downwards that come into contact with the walls of the element 29 to refer it in position both in the direction of the x axis, and in the direction of the y axis; the precise positioning in the direction of the z-axis is given by the engagement with additional locating surfaces of the body P.

As clearly apparent from the foregoing, thanks to the use of the additive manufacturing technology, in the gripping tool 8 according to the invention the supporting bodies P of the gripping devices 50 can be obtained with a configuration such as to simultaneously perform a plurality of functions. First of all, each supporting body P obtained by additive manufacturing has the function of carrying the gripping devices 50. Secondly, the supporting bodies P have the function of carrying one or more sensors suitable for detecting the piece picked-up or gripped, or to be picked-up or to be gripped. Thirdly, each supporting body P also performs the function of defining locating surfaces intended to come into contact with the picked-up piece to refer the piece into a precise position with respect to the tool along one or more axes.

During use, in an initial calibration step, the robot manipulator places the gripping tool 8, with a piece picked up thereby, in a predetermined and programmed position, inside an assembling station, corresponding to the theoretical position of the picked-up piece in a correctly assembled condition. The robot controller controls the position of the robot wrist, and consequently of the tool 8 connected to the robot wrist, with respect to a predetermined Cartesian axes system. With respect to this same reference system, the assembling station is designed to locate in a precise position, on the stationary structure of the station, a piece (for example, a floor panel portion) on which the piece (or the pieces) picked-up by the tool 8 must be positioned and assembled. Once the robot has moved to its predetermined programmed position in the assembling station, an operator can intervene on the clamps 19-23 to adjust the position of each supporting body P with respect to the frame 9 of the tool, along three mutual orthogonal directions, until the correct positioning of the picked-up pieces is obtained on the elements previously arranged in the assembling station. The aforesaid clamps are then tightened again in this condition, after which the tool is calibrated to be used, without further loss of time, to repeat the same cycle of operations in the production step.

Naturally, without prejudice to the principle of the invention, the embodiments and construction details may vary widely with respect to those described and illustrated, purely by way of example, without thereby departing from the scope of the present invention, as defined in the attached claims.

The invention claimed is:

1. A gripping tool which can be used by a manipulator device for picking up and handling pieces, said gripping tool comprising:
   a supporting frame (9), provided with an attachment flange (12) for connection to the manipulator device;
   a plurality of gripping devices (50), carried by the supporting frame (9) so as to be adjustable in position with respect to the supporting frame (9);
   at least one sensor(S) associated with the gripping devices (50), to detect a presence of a piece engaged by the gripping devices,
   wherein:
   the plurality of gripping devices (50) are distributed in groups, each group being constituted by one or more gripping devices (50),
   the one or more gripping devices (50) of each group of gripping devices are mounted on a single supporting body (P) made in one-piece by an additive manufacturing technology,
   said supporting body (P) of each group of gripping devices (50) is mounted on said supporting frame (9) so as to be adjustable in position with respect to the supporting frame (9) along three mutually orthogonal axes (x, y, z),
   said supporting body (P) of each group of gripping devices (50) made in one-piece by an additive manufacturing technology comprises a configuration defining at least two locating surfaces (25, 27, 31, 32, 33, or 34), which are to come in contact with the piece to be engaged, the configuration of said at least two locating surfaces (25, 27, 31, 32, 33, or 34) adapted to a configuration of the piece to be engaged, so as to constitute a reference for proper positioning of the piece to be engaged along said three mutually orthogonal axes (x, y, z) with respect to said supporting body (P), said gripping tool being characterized in that the single supporting body (P) of each group of gripping devices (50) comprises one or more connecting portions (B) in a one-piece construction, said one or more connecting portions each define a cavity within which a supporting rod (18) is secured, each supporting rod is carried by the supporting frame (9) so as to be adjustable in position relative to the supporting frame.

2. The gripping tool according to claim 1, wherein the single supporting body (P) supports said at least one sensor(S).

3. The gripping tool according to claim 1, wherein the one or more connecting portions (B) of each single supporting body (P) comprises two connecting portions (B); and
   the supporting rod (18) comprises a pair of supporting rods, each supporting rod of the pair of supporting rods is connected to a respective of the two connecting portions of the single supporting body, the pair of supporting rods are carried by the supporting frame and are adjustable in position relative to the supporting frame.

4. The gripping tool according to claim 3, comprising:
   an auxiliary supporting tube having a first axis, the auxiliary supporting tube is supported by the supporting frame, the pair of supporting rods supporting the single supporting body for each group of the gripping devices are lockable to the auxiliary supporting tube allowing adjustment in position of the single supporting body relative to the auxiliary supporting tube parallel to a respective axis of each supporting rod of the pair of supporting rods and a parallel to the first axis of the auxiliary supporting tube.

5. The gripping tool according to claim 4, comprising:
   a main supporting tube having a second axis oriented at an angle relative to the first axis of the auxiliary supporting tube, the main support tube is supported by the supporting frame,
   wherein the auxiliary supporting tube is lockable to the main supporting tube allowing adjustment in position of the auxiliary supporting tube relative to the main supporting tube along the second axis.

6. The gripping tool of claim 5, wherein the angle of the second axis of the main supporting tube relative to the first axis of the auxiliary supporting tube is 90 degrees, and
   wherein the first axis of the auxiliary supporting tube is oriented orthogonally to the respective axis of each supporting rod.

7. A gripping tool which can be used by a manipulator device for picking up and handling pieces, said gripping tool comprising:
   a supporting frame (9), provided with an attachment flange (12) for connection to the manipulator device;
   a plurality of gripping devices (50), carried by the supporting frame (9) so as to be adjustable in position with respect to the supporting frame (9);
   at least one sensor(S) associated with the gripping devices (50), to detect a presence of a piece engaged by the gripping devices, wherein:

the plurality of gripping devices (50) are distributed in groups, each group being constituted by one or more gripping devices (50), the one or more gripping devices (50) of each group of gripping devices are mounted on a same supporting body (P) made in one-piece by an additive manufacturing technology, said supporting body (P) of each group of gripping devices (50) is mounted on said supporting frame (9) so as to be adjustable in position with respect to the supporting frame (9) along three mutually orthogonal axes (x, y, z), said supporting body (P) of each group of gripping devices (50) made in one-piece by an additive manufacturing technology comprises a configuration defining at least two locating surfaces (25, 27, 31, 32, 33, or 34), which are to come in contact with the piece to be engaged, the configuration of said at least two locating surfaces (25, 27, 31, 32, or 34) adapted to a configuration of the piece to be engaged, so as to constitute a reference for proper positioning of the piece to be engaged along said three mutually orthogonal axes (x, y, z) with respect to said supporting body (P), said gripping tool being characterized in that the supporting body (P) of each group of gripping devices (50) comprises one or more connecting portions (B) in a one-piece construction, said one or more connecting portions each define a cavity within which a supporting rod (18) is secured, each supporting rod is carried by the supporting frame (9) so as to be adjustable in position relative to the supporting frame, wherein said plurality of gripping devices (50) are magnetic-effect gripping devices each comprising a supporting casing (2) and a magnet (3), the magnet is pneumatically movable within the supporting casing (2) between an operative position adjacent to a front end (4) of the supporting casing (2), which is configured to engage the piece to be engaged, and an inoperative position spaced rearwardly with respect to said front end (4) of the supporting casing (2), said gripping tool being characterized in that the supporting casing (2) of each magnetic-effect gripping device (50) is rigidly connected to a respective supporting body (P).

8. A gripping tool which can be used by a manipulator device for picking up and handling pieces, said gripping tool comprising:

a supporting frame (9), provided with an attachment flange (12) for connection to the manipulator device;

a plurality of gripping devices (50), carried by the supporting frame (9) so as to be adjustable in position with respect to the supporting frame (9);

at least one sensor(S) associated with the gripping devices (50), to detect a presence of a piece engaged by the gripping devices, wherein:

the plurality of gripping devices (50) are distributed in groups, each group being constituted by one or more gripping devices (50), the one or more gripping devices (50) of each group of gripping devices are mounted on a same supporting body (P) made in one-piece by an additive manufacturing technology, said supporting body (P) of each group of gripping devices (50) is mounted on said supporting frame (9) so as to be adjustable in position with respect to the supporting frame (9) along three mutually orthogonal axes (x, y, z), said supporting body (P) of each group of gripping devices (50) made in one-piece by an additive manufacturing technology comprises a configuration defining at least two locating surfaces (25, 27, 31, 32, 33, or 34), which are to come in contact with the piece to be engaged, the configuration of said at least two locating surfaces (25, 27, 31, 32, 33, or 34) adapted to a configuration of the piece to be engaged, so as to constitute a reference for proper positioning of the piece to be engaged along said three mutually orthogonal axes (x, y, z) with respect to said supporting body (P), said gripping tool being characterized in that the supporting body (P) of each group of gripping devices (50) comprises one or more connecting portions (B) in a one-piece construction, said one or more connecting portions each define a cavity within which a supporting rod (18) is secured, each supporting rod is carried by the supporting frame (9) so as to be adjustable in position relative to the supporting frame, wherein said supporting rod (18) is lockable in position along an axis of the supporting rod within a clamp (19), the clamp (19) is adjustable in position on a respective auxiliary supporting tube (20) along a first axis oriented orthogonal to the axis of the supporting rod (18), said auxiliary supporting tube (20) is adjustable in position along a second axis of a main supporting tube (17) oriented orthogonal to the first axis and oriented orthogonal to the axis of the supporting rod (18), the main supporting tube (17) carried by said supporting frame (9) of the gripping tool.

9. A method of using a gripping tool associated with a manipulator device and is used to engage a piece and to position the piece in a correct assembling position on an element provided on a stationary fixture of an assembling station, wherein the gripping tool comprises:

a supporting frame (9), provided with an attachment flange (12) for connection to the manipulator device;

a plurality of gripping devices (50), carried by the supporting frame (9) so as to be adjustable in position with respect to the supporting frame (9);

at least one sensor(S) associated with the gripping devices (50), to detect a presence of the piece engaged by the gripping devices, wherein:

the plurality of gripping devices (50) are distributed in groups, each group being constituted by one or more gripping devices (50), the one or more gripping devices (50) of each group of gripping devices are mounted on a same supporting body (P) made in one-piece by an additive manufacturing technology, said supporting body (P) of each group of gripping devices (50) is mounted on said supporting frame (9) so as to be adjustable in position with respect to the supporting frame (9) along three mutually orthogonal axes (x, y, z), said supporting body (P) of each group of gripping devices (50) made in one-piece by an additive manufacturing technology comprises a configuration defining at least two locating surfaces (25, 27, 31, 32, 33, or 34), which are to come in contact with the piece to be engaged, the configuration of said at least two locating surfaces (25, 27, 31, 32, 33, or 34) adapted to a configuration of the piece to be engaged, so as to constitute a reference for proper positioning of the piece to be engaged along said three mutually orthogonal axes (x, y, z) with respect to said supporting body (P), said gripping tool being characterized in that the supporting body (P) of each group of gripping devices (50) comprises one or more connecting portions (B) in a one-piece construction, said one or more connecting portions each define a cavity within which a supporting rod (18) is secured, each supporting rod is carried by the supporting frame (9) so as to be adjustable in position relative to the supporting frame, and wherein in an initial calibration step of said station, once the manipulator device has moved to a predetermined programmed position, corresponding theoretically to the correct assembling position of the engaged piece, a position of the engaged piece with respect to the gripping tool is adjusted by adjusting a position of each of said supporting body (P) of the groups of gripping devices (50) with respect to said supporting frame (9), until a proper positioning of the engaged piece with respect to the element provided at the station is actually obtained.

\*   \*   \*   \*   \*